(No Model.)　　　　　　　　　　　　　　　2 Sheets—Sheet 1.
J. McINTYRE.
SAFETY GUARD FOR HOLLOW BODIES.
No. 575,526.　　　　　　　　　Patented Jan. 19, 1897.
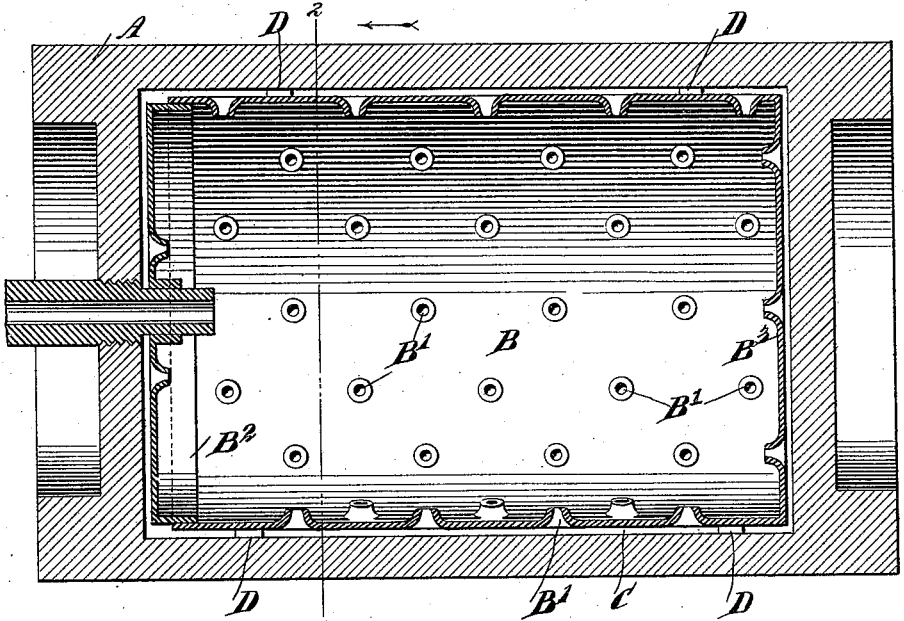
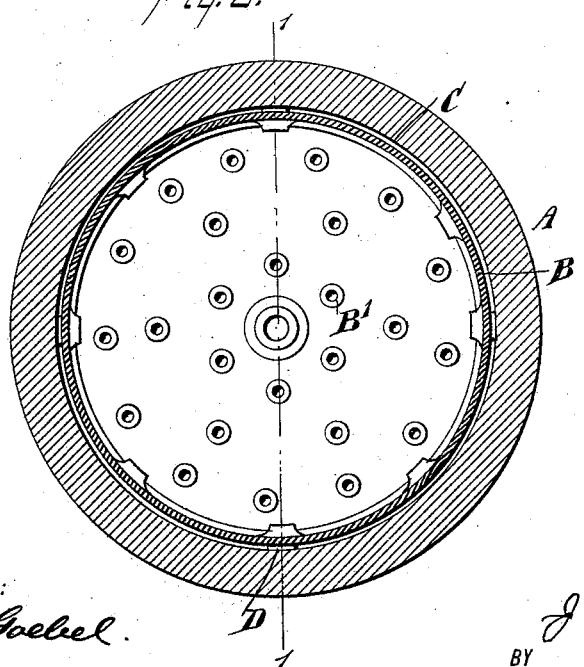
WITNESSES:　　　　　　　　　　　　　INVENTOR
William P. Goebel.　　　　　　　　　J. McIntyre
　　　　　　　　　　　　　　　　　　BY
　　　　　　　　　　　　　　　　　　ATTORNEYS.

(No Model.) 2 Sheets—Sheet 2.
J. McINTYRE.
SAFETY GUARD FOR HOLLOW BODIES.
No. 575,526. Patented Jan. 19, 1897.
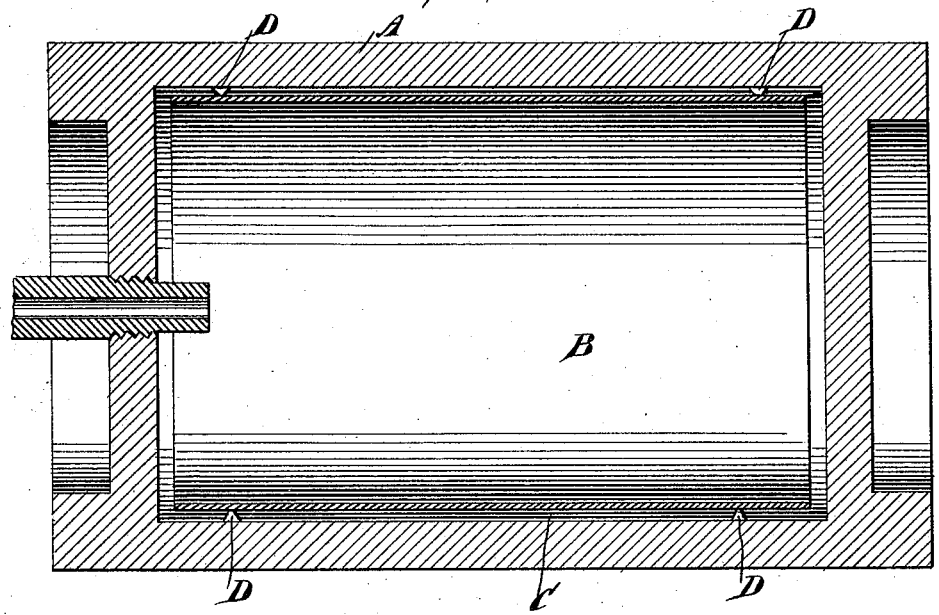
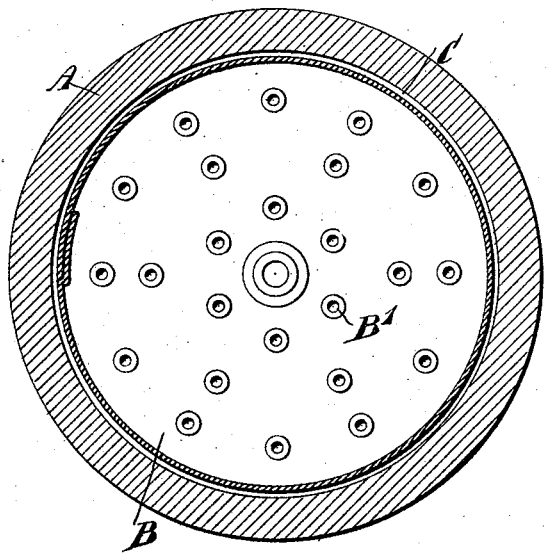 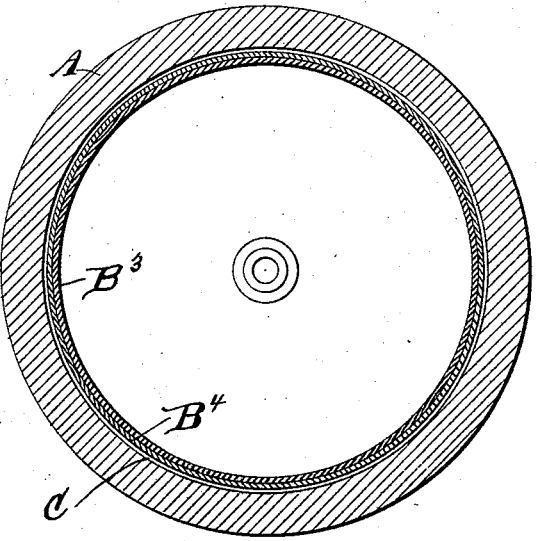
WITNESSES:
William P. Goebel.
Thev. G. Hoskn.
INVENTOR
J. McIntyre.
BY
Munn
ATTORNEYS.

UNITED STATES PATENT OFFICE.

JOHN McINTYRE, OF JERSEY CITY, NEW JERSEY.

SAFETY-GUARD FOR HOLLOW BODIES.

SPECIFICATION forming part of Letters Patent No. 575,526, dated January 19, 1897.

Application filed February 7, 1896. Serial No. 578,332. (No model.)

*To all whom it may concern:*

Be it known that I, JOHN McINTYRE, of Jersey City, in the county of Hudson and State of New Jersey, have invented a new and Improved Safety-Guard for Hollow Bodies, of which the following is a full, clear, and exact description.

The invention relates to hollow bodies containing gaseous and other fluids under pressure; and the object of the invention is to provide a new and improved safety or emergency guard for such hollow bodies to prevent damage to surrounding objects by preventing a sudden escape of a large volume of the gaseous contents of the body in case the latter is ruptured or burst.

The invention consists of a guard that is pressureless within the hollow body until rupture of the body occurs.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a longitudinal section of the improvement. Fig. 2 is a cross-section of the same on the line 2 2 of Fig. 1. Fig. 3 is a longitudinal section of a modified form of the improvement, and Figs. 4 and 5 are cross-sections of other modified forms of the improvement.

As illustrated in Fig. 1, the sealed hollow body A, adapted to contain the gaseous fluid under pressure, is provided with a safety or emergency guard B, arranged close to the inner wall of the body A to form with said wall a space C in communication with the interior of the guard to permit the fluid to fill this space, so as to equalize the pressure on both sides of the guard and render the latter pressureless. Now in case the hollow body A should be ruptured or burst by an excessive inside pressure or from other causes (internal or external) then the guard obstructs the flow and prevents a rapid or sudden escape of the gaseous contents of the hollow body, and consequently damage which would otherwise result to the surrounding objects from the large volume of the suddenly-liberated fluid is entirely avoided.

The form of the guard may be greatly varied, also the means for establishing communication between the interior of the shell and the space C. For instance, as shown in Figs. 1 and 2, the guard is in the form of a tubular shell having perforations B' and heads $B^2$ $B^3$, which may be loose or fixed. The perforations are formed by apertured inwardly-extending dents and are proportionately scattered over the whole shell with a collective area sufficient to practically maintain an equal pressure in the shell and the space C, so that when a rupture in the body A occurs then the shell, owing to the equal pressure on both its inner and outer sides, is not liable to burst with the body A, and the shell by its obstruction causes a slow reduction of the pressure of the gaseous fluid and prevents instantaneous escapement of the fluid in large volume and consequent destruction of surrounding objects.

The loose head $B^2$ in the shell accomplishes the closing up of the body A. The shell may also be sprung into the body with its sides overlapping, as illustrated in Fig. 4, so that the shell can be readily fitted in bodies of different diameters. The body A represents a tube with the heads welded on and with the emergency-guard inserted into the body A before the last head is put into position for welding or sealing.

In the modified form shown in Fig. 5 the thin shell-guard $B^3$ is provided with an exterior lining of asbestos cloth or other suitable packing-material $B^4$. The exterior diameter of this shell and lining is slightly less than the interior diameter of the hollow body to form the space C for the fluid to pass into from the interior of the shell to prevent the said shell and its packing from forming a resistance to the pressure of the fluid within the shell and before a rupture of the tube occurs.

It is understood that the space C is infinitely small, and in some cases an ordinary loose fit of the guard in the tube will form the necessary space and fully answer the purpose.

For smooth-bore bodies A and smooth-turned guards B the latter is held a suitable distance from the inner surface of the body by minute spacing-pieces D to form the space C and insure a film of the gaseous contents in said space, but when the body A and guard B are in the ordinary rough form of iron and steel tubes then the minute protuberances formed by the roughness at the adjacent surfaces are sufficient to produce the said space C and to insure a sufficient and constant pressure therein and equal to that within the shell until the rupture of the body A occurs. It is also evident that the heads of the shell may be dispensed with, as shown in Fig. 3, so that the fluid passes through the open ends of the shell into the space C to insure an equal pressure on both the inside and outside of the shell.

Having thus fully described my invention, I claim as new and desire to secure by Letters Patent—

1. A hollow body and a pressureless emergency-guard within the said hollow body, substantially as shown and described.

2. A hollow body and an internal emergency-guard forming a space between the guard and body, the space being in communication with the interior of the guard, to insure an equal pressure on both the inside and outside of the guard, substantially as shown and described.

3. A hollow body and an emergency-guard consisting of a perforated shell within the said body, and spacing-pieces or minute protuberances between the inner surfaces of the said body and the exterior surface of the said shell, substantially as shown and described.

4. A hollow body provided with an emergency-guard consisting of a perforated shell within the said body and having overlapping sides, substantially as shown and described.

5. A hollow body and an emergency-guard, consisting of a perforated shell within the body and forming a space between said body and guard, the said shell being provided with an adjustable head or heads, substantially as shown and described.

JOHN McINTYRE.

Witnesses:
THEO. G. HOSTER,
JNO. M. RITTER.